US005512132A

United States Patent [19]

Stewart et al.

[11] Patent Number: 5,512,132

[45] Date of Patent: Apr. 30, 1996

[54] METHOD FOR CUTTING AND PLACING INDIVIDUAL CHIPS OF LIGHT LOCK MATERIAL

[75] Inventors: Wallace S. Stewart; Danny L. Greisch, both of Rochester, N.Y.

[73] Assignee: Eastman Kodak Company, Rochester, N.Y.

[21] Appl. No.: 308,885

[22] Filed: Sep. 19, 1994

Related U.S. Application Data

[62] Division of Ser. No. 999,646, Dec. 31, 1992, Pat. No. 5,368,464.

[51] Int. Cl.$^6$ .............. B32B 31/18

[52] U.S. Cl. .............. 156/73.3; 156/251; 156/580.2; 354/277; 269/54.1; 221/214

[58] Field of Search .............. 156/73.1, 73.3, 156/250, 251, 580.1, 580.2; 354/277; 269/50, 54.1, 47, 900, 909; 221/214; 83/95

[56] References Cited

U.S. PATENT DOCUMENTS

| | | | |
|---|---|---|---|
| 3,367,809 | 2/1968 | Soloff | 156/73 |
| 3,431,593 | 3/1969 | Miller | 18/1 |
| 3,439,848 | 5/1967 | Schwarzkopf | 225/96 |
| 3,493,457 | 2/1970 | Jugler | 156/580 |
| 3,506,510 | 4/1970 | Berleyoung | 156/73 |
| 3,537,376 | 11/1970 | Fleming et al. | 354/277 |
| 3,650,647 | 3/1972 | Jacobs et al. | 425/109 |
| 3,683,736 | 8/1972 | Loose | 83/16 |
| 3,697,357 | 10/1972 | Obeda | 156/510 |
| 3,748,715 | 7/1973 | Hoover et al. | 29/211 D |
| 3,756,880 | 9/1973 | Graczyk | 156/73 |
| 3,783,061 | 1/1974 | Hahn | 156/73 |
| 3,884,738 | 5/1975 | Hofius, Sr. | 156/73.1 |
| 3,889,563 | 6/1975 | Westermann | 83/124 |
| 3,930,296 | 1/1976 | Hoover | 29/430 |
| 4,040,886 | 8/1977 | Yen et al. | 156/350 |
| 4,080,229 | 3/1978 | Williams | 156/73.1 |
| 4,083,737 | 4/1978 | Foote, Jr. et al. | 156/73.1 |
| 4,097,327 | 6/1978 | Calemard | 156/515 |
| 4,124,242 | 11/1978 | Canner | 221/214 |
| 4,491,491 | 1/1985 | Stumpf | 156/73.3 |
| 4,500,372 | 2/1985 | Mion | 156/73.3 |
| 4,572,753 | 2/1986 | Bach | 156/73.1 |
| 4,618,392 | 10/1986 | Uchimura et al. | 156/384 |
| 4,623,411 | 11/1986 | Pollak et al. | 156/93 |
| 4,690,722 | 9/1987 | Flood | 156/510 |
| 4,732,631 | 3/1988 | Shimizu | 156/73.3 |
| 4,752,351 | 6/1988 | Lunt | 156/580.1 |
| 4,770,730 | 9/1988 | Abe | 356/73.1 |
| 4,812,198 | 3/1989 | Fuke et al. | 156/497 |
| 4,863,542 | 9/1989 | Oshefsky et al. | 156/160 |
| 4,960,480 | 10/1990 | Iwamoto | 156/256 |
| 5,158,640 | 10/1992 | Akiyama | 156/542 |
| 5,198,056 | 3/1993 | Stockli et al. | 156/73.1 |

FOREIGN PATENT DOCUMENTS

| | | |
|---|---|---|
| 440241A2 | 8/1991 | European Pat. Off. . |
| 2092047 | 8/1982 | United Kingdom . |

*Primary Examiner*—David A. Simmons
*Assistant Examiner*—J. Sells
*Attorney, Agent, or Firm*—Clyde E. Bailey, Sr.

[57] ABSTRACT

The present invention relates to a novel method and apparatus for cutting small pieces of fabric by means of an ultrasonic horn and a hollow open centered cutting anvil. The cutting operation includes a pick mechanism incorporating two tapered pins and a stripper pad to maintain the fabric position before, during, and after the cutting operation. The pick head mechanism is designed to insure accuracy in locating these small fabric pieces, referred to as chips, in a subsequent assembly operation performed by the pick head.

The assembly operation relates to attachment of small pieces of fabric by means of two miniature ultrasonic horns. The horns are combined with a pick and place mechanism which incorporates two tapered pins and a stripper pad to maintain the fabric position during the manufacturing process. This pick and place head, when attached to a robotic arm, is designed to insure accuracy in locating these small fabric pieces repeatedly in a thermoplastic cartridge.

5 Claims, 8 Drawing Sheets

METHOD FOR CUTTING AND PLACING INDIVIDUAL CHIPS OF LIGHT LOCK MATERIAL

This is a Divisional of application Ser. No. U.S. 999,646, filed Dec. 31, 1992, U.S. Pat. No. 5,368,464.

TECHNICAL FIELD

This invention relates to an ultrasonic apparatus for cutting and placing individual chips of light lock material in a cartridge. More particularly, the invention provides an ultrasonic horn and hollowed center anvil for cutting and holding a chip of light lock material. A pin mechanism then picks the chip out of the hollow center of the anvil and transports it to a cartridge by means of a pivotable arm to which the pins are mounted. A pad forces the chip off of the pins and into the cartridge, where ultrasonic horns tack the chip to the cartridge.

BACKGROUND ART

Most film cartridges (also called film magazines) incorporate some kind of fabric or woven material in their assembly as a means of preventing light from entering the film exit in the cartridge. This guards against premature exposure of the outer convolutions of the film. A common fabric incorporated as a light lock material is referred to as "velvet". Referring to FIG. 1, velvet is a nylon yarn fiber 92 which is bundled and woven into a rayon fabric backing material 94.

Assembly of the velvet light lock material to conventional metal film cartridges is accomplished by applying heat to both lips of the cartridges which have been formed by a die set (but are still in a multiple strip stage yet to be died out). The velvet is pre-slit to size and applied in continuous web form to both sides of the multi cartridge strip in the proper locations. The velvet web is then clamped under pressure while the heat from the metal cartridge strip activates an adhesive coated on the back of the rayon fabric of the velvet (see 96 in FIG. 1), attaching the rayon backing of the light lock web to the cartridge strip. Once the adhesive has cured, the cartridge strip is indexed to the next step in the process. There the two velvet webs are cut between the individual notches denoting each cartridge by a hot knife process. This process is satisfactory as long as the outer shell of the cartridge is made of sheet steel.

However, a new polystyrene cartridge is being developed as a consumer product in the 135 millimeter film range (cite!). One of the main requirements of this new product is that the cartridge shell be made of plastic instead of sheet steel. This brings a whole multitude of design changes in the way to achieve automated assembly of velvet light lock to film cartridges.

SUMMARY OF THE INVENTION

This need is met by the subject invention which provides a method and apparatus for cutting a small individual fabric piece by means of an ultrasonic horn and a hollow open centered cutting anvil. The fabric piece is retained in position and secured between the ultrasonic horn and the cutting anvil by a pick mechanism having two tapered pins and a stripper pad. The pick mechanism is lowered through the back side of the hollow cutting anvil after a pneumatic actuator locates the ultrasonic horn in position against the fabric web, compressing it into the cutting edge of the anvil. At this point, the ultrasonic horn is energized completing the die operation or cut of the fabric piece. The actuator remains in its extended position, holding the ultrasonic horn against the cutting anvil, while the pick head removes the cut fabric piece back up through the back of the anvil. This process enables accuracy in maintaining position of the fabric piece during the cutting process and also for placement of the fabric piece by the pick head in the assembly procedure where it is located in the plastic cartridge.

The assembly procedure as per the subject invention provides a method and apparatus for attaching the small individual rectangular fabric piece by means of two miniature ultrasonic horns and two tapered pins located in a mechanical placement device (e.g. the pick and place mechanism) attached to the end of a robotic arm. As discussed above, previous to the ultrasonic assembly the robotic arm is located over the ultrasonic cutting die. The two tapered pins have captured the fabric by penetration through the fabric before the die process of the chip is complete. The robotic arm then removes the died out chip upwards from the die anvil, and, as part of the assembly procedure, rotates 90 degrees. The robotic arm then descends to place the fabric chip in its proper cartridge location by use of the pneumatically operated stripper pad approximating the size of the chip. The pad has clearance holes equally spaced and centered across its length for location of the ultrasonic horns and tapered pins, with the pins being located outboard of the horn tips.

When the stripper pad is activated it descends, moving the fabric chip downwards along the pins until the chip contacts the cartridge. While the chip is secured by the pin tips, the ultrasonic horns are lowered pneumatically and energized when the horn tips come in contact with the fabric chip. The ultrasonic energy from the horn tips spot welds the fabric to the cartridge in two places centered along the length of chip. This weld is sufficient to hold the chip in place until the cartridge assembly is complete, at which time the fabric chip is completely restricted and secured.

A method and apparatus for cutting, picking, placing, and tacking individual fabric pieces into a cartridge is thus provided.

BRIEF DESCRIPTION OF THE DRAWINGS

These and other objects, advantages and features of the present invention will be more fully understood from the following detailed description of certain embodiments thereof when considered in conjunction with the accompanying drawings in which.

DESCRIPTION OF THE PREFERRED EMBODIMENTS

Figure 1:
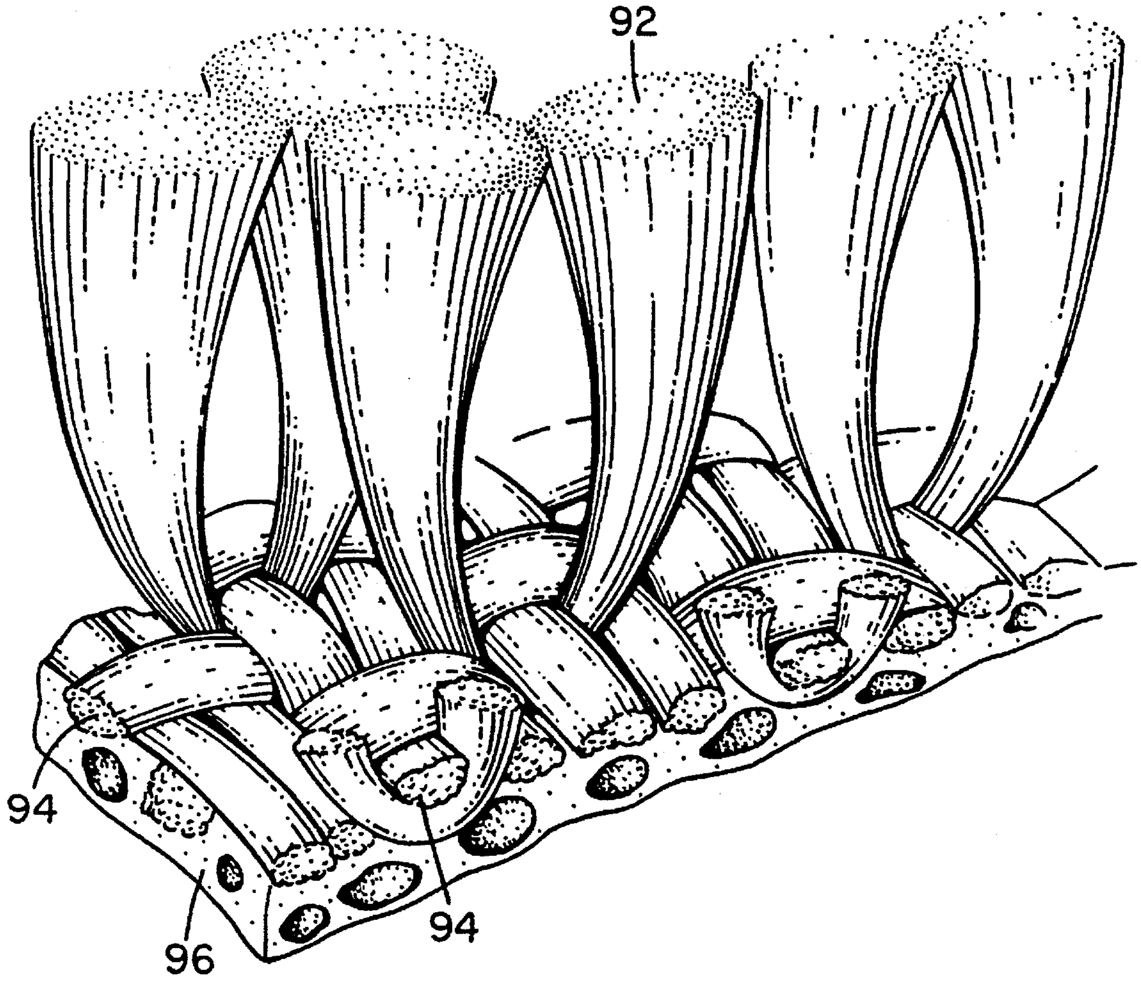
FIG. 1 is a partially cut-away isometric view of the structure of velvet light lock material.

As indicated above, the subject invention is broadly directed to a cutting, picking, placing and tacking apparatus for securing individual chips of fabric material into a cartridge. Specifically, a velvet fabric is presented to an ultrasonic work station in web form by a shuttle mechanism which unwinds the web from a stockroll. A pneumatic cylinder actuator carriage, which contains the ultrasonic horn assembly, is mounted upside down on the side of a machine frame. In this configuration, the pneumatic actuator thrusts upwards to contact a hollow die cutting anvil.

The orientation of the web is velvet pile side up facing the cutting anvil, and backing side of the web down facing the ultrasonic horn tip. This is necessary for two reasons. First, the upside down design is required to allow the robot pick and place mechanism to capture the velvet side of the web in the up orientation for proper placement in the product. But most importantly, the clean cut is only achievable when the ultrasonic horn is presented to the bottom side of the velvet material. In this orientation, the velvet pile is cut by the anvil, assisted by ultrasonic energy from the flat face surface on the horn. The pile is divided at the perimeter of the cutting surface and as the ultrasonic horn forces the anvil cutting surface to break through the velvet base weave, the heat created by the ultrasonic vibration transfers to the anvil. This melts the perimeter edge, leaving a very clean appearing cut. In the reverse orientation, the ultrasonic horn melts the velvet pile into hardened burnt residue at the perimeter edge of the chip. This is unacceptable cosmetically and will damage the product.

When the velvet web is advanced into position, the pneumatic actuator raises the ultrasonic horn assembly until it makes contact with the velvet web, pressing it against the cutting anvil. The energy to the ultrasonic horn assembly, provided by a twenty Kilohertz ultrasonic generator, is delayed to allow self alignment of the ultrasonic horn working face to the cutting surface of the anvil by means of a compliant perimeter gasket located between the cutting anvil and the underside of the machine table top.

At approximately the same time as this delay, a pick mechanism is lowered through a rectangular hole in the table top. The pick mechanism contains two tapered pins which are connected through a stripper pad to the pick head. The stripper pad is the same size as the velvet chip and is used to remove the velvet chip from the pins at the next assembly station. The pick mechanism continues downward until it nests in the hollow portion of the cutting anvil with the pins forced into the velvet material but not protruding through the backing side. Two clearance holes are located in the ultrasonic horn working face to accept the presence of the pins.

When the alignment is complete and the pick mechanism is in place, the ultrasonic horn is energized, cutting the velvet chip to size against the cutting edge of the anvil. When the cutting anvil breaks through the thickness of the velvet web and makes contact with the ultrasonic horn, the ultrasonic generator is de-energized. With the velvet chip now cut to size and still retained in place by the tapered pins, the pick head is lowered further, sending the pins into the clearance holes in the ultrasonic horn until the velvet chip is pressed completely up the pins' lengths and forced against the stripper pad. Now the pick mechanism removes the velvet chip upward out of the cutting anvil, and the velvet chip is retained by the tapered pins for placement in the film cartridge. Then the pneumatic actuator retracts the ultrasonic horn assembly down to its home position while the shuttle mechanism advances the velvet web.

At this point in the machine cycle, a cartridge shell half has been located in the cartridge nest on the machine work table. The robotic arm, having captured the velvet chip, retracts the pick and place mechanism upwards out of the cavity of the hollow cutting anvil. The robotic arm rotates 90 degrees over the machine work station table. The robotic arm, now placed precisely over the cartridge half where the light lock material must be assembled and having the velvet chip impelled on the tapered pins completely recessed to the stripper pad, is lowered to the light lock area provided in the cartridge half. With the tips of the pins slightly contacting the recessed area in the proper location of the cartridge half, made possible by the repeatability of the robotic arm, the stripper pad is pneumatically lowered. This action forces the velvet light lock chip to be placed in the proper recessed area of cartridge half.

With the velvet chip now in place, and while the stripper pad and tapered pins have the chip secured to the cartridge surface, the two 70 Kilohertz ultrasonic horns are lowered pneumatically down through two matching holes in the stripper pad inboard of the pins. At this time two 70 Kilohertz ultrasonic generators are energized and the 70 Kilohertz transducers attached to the backs of the ultrasonic horns provide the conversion of high frequency oscillating electrical power to mechanical vibration. This ultrasonically tacks the velvet light lock chip to the cartridge in two locations equally spaced from both ends along the center of its length. A bottom stop in the ultrasonic horn assembly carriage is provided to prevent the horn tips from penetration beyond 0.005 inch into the cartridge surface. At the completion of this very short ultrasonic weld cycle, the horn assemblies are retracted, the stripper pad and tapered pins are retracted, and the robotic arm is moved upward away from the completed assembly of the velvet light lock chip to the thermoplastic cartridge. With this cycle complete, the robotic arm returns to the hollow cutting anvil to begin the next cycle while the completed cartridge half is removed and replaced with another cartridge half which is ready for assembly.

Figure 2:
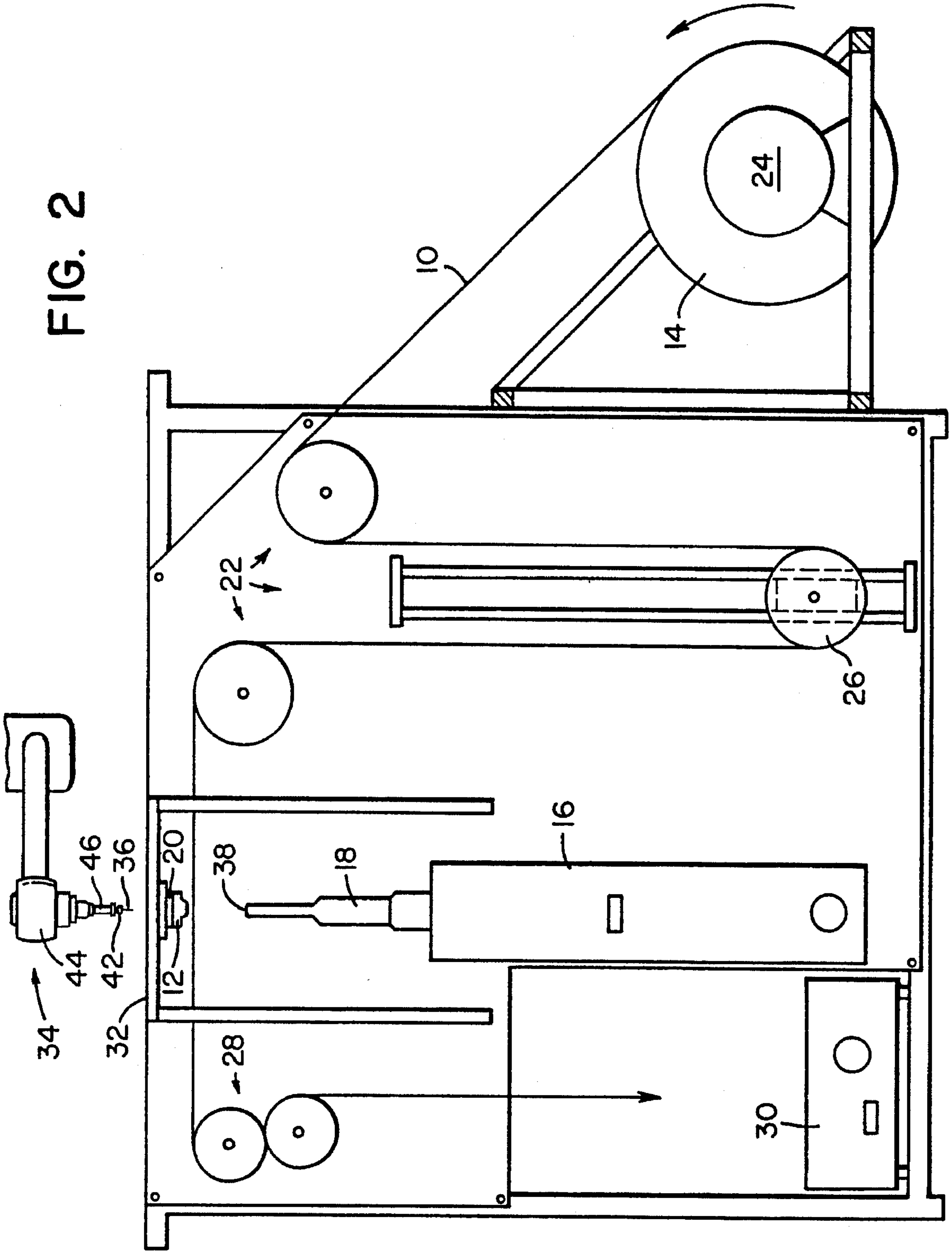
FIG. 2 is a cross-sectional side view of a cutting and picking apparatus which is one embodiment of the subject invention.

With reference to the drawings, FIG. 2 is a cross-sectional side view of a cutting and picking mechanism according to the subject invention. There is shown a velvet fabric web 10 which is slit to a width wider than the hollow cutting anvil 12 and wound on a stockroll 14. The web is presented to the ultrasonic work station, consisting of the ultrasonic actuator 16, ultrasonic horn 18, hollow cutting anvil 12, and the compliant elastic gasket 20 by means of a shuttle mechanism 22. The shuttle mechanism 22 unwinds the web 10 from the stockroll 14 by way of an electrical stepping motor 24 that drives the stockroll 14 counter clockwise. A series of rollers including a tension roller 26 and an electrically driven pinch roll assembly 28 prevent against slack in the web 10.

The velvet orientation is nylon yarn fiber pile up with the rayon fabric backing facing down (see FIG. 1 for velvet structure). When the velvet web 10 is advanced in position under the hollow cutting anvil 12, the pneumatic ultrasonic actuator 16 raises the ultrasonic horn assembly 18 until it comes in contact with the backing side of the velvet web 10. The ultrasonic generator 30 which supplies ultrasonic energy to the ultrasonic horn 18 remains de-energized while the actuator 16 continues to raise the ultrasonic horn 18, compressing the velvet into the cutting edge of the anvil 12. This shapes the velvet to the proper size and parts the nylon fibers along the inside and outside edges of the cutting surface perimeter. The cutting anvil 12 is designed in such a way to leave no frayed edges and the least amount of velvet fabric hairs to prevent particle debris below the cutting area.

Figure 3:
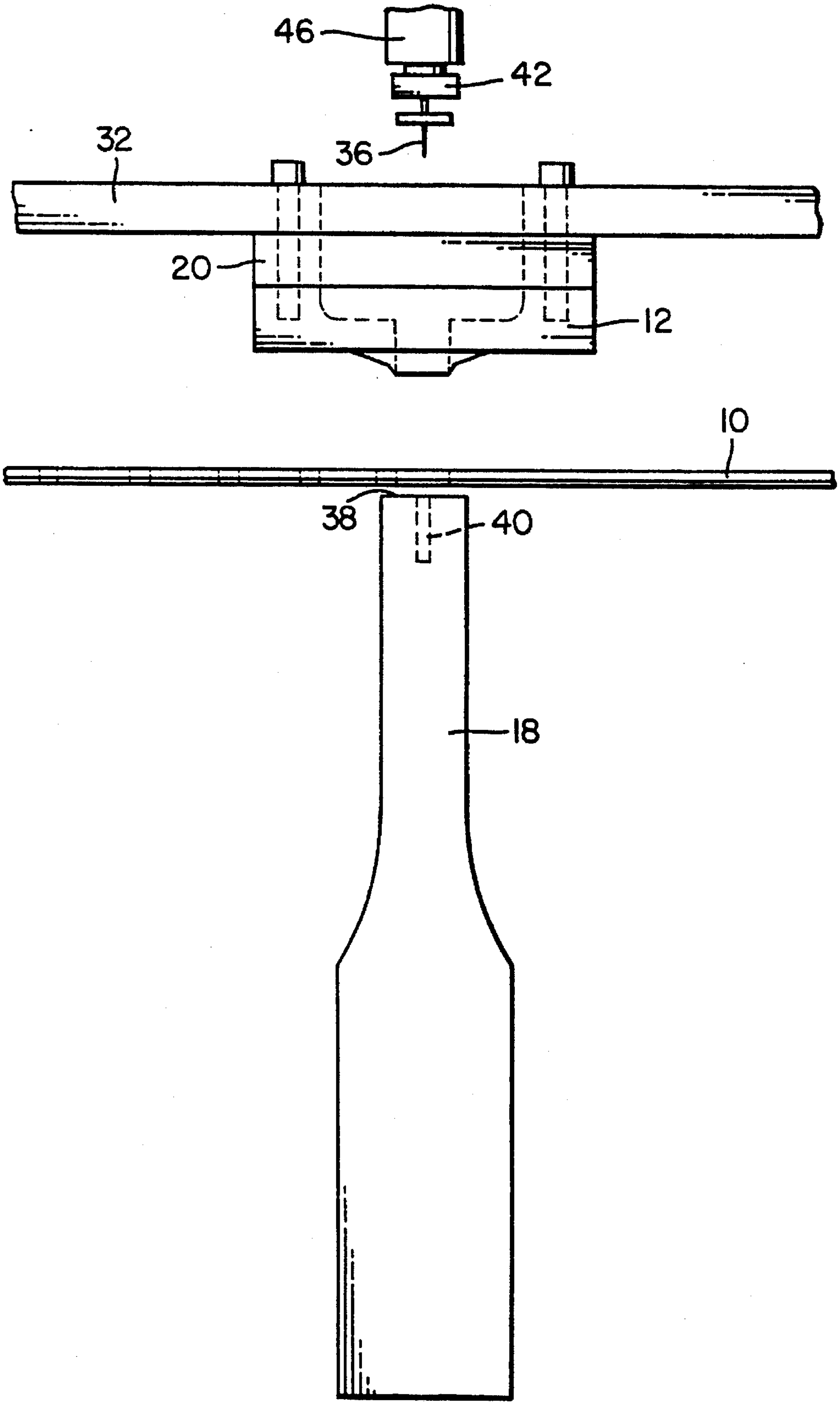
FIG. 3 is a side view of the cutting mechanism shown in FIG. 2.

The ultrasonic generator 30 is delayed from energizing the ultrasonic horn 18 to allow the cutting anvil 12 and ultrasonic horn 18 to self align by means of a compliant gasket 20 located around the back perimeter of the cutting anvil 12 and bolted between the cutting anvil 12 and the machine table 32 (see also FIG. 3). This insures an even clean cut around the perimeter of the velvet chip and reduces the length of time required for the ultrasonic generator 30 to remain energized to complete the cut.

Figure 5:
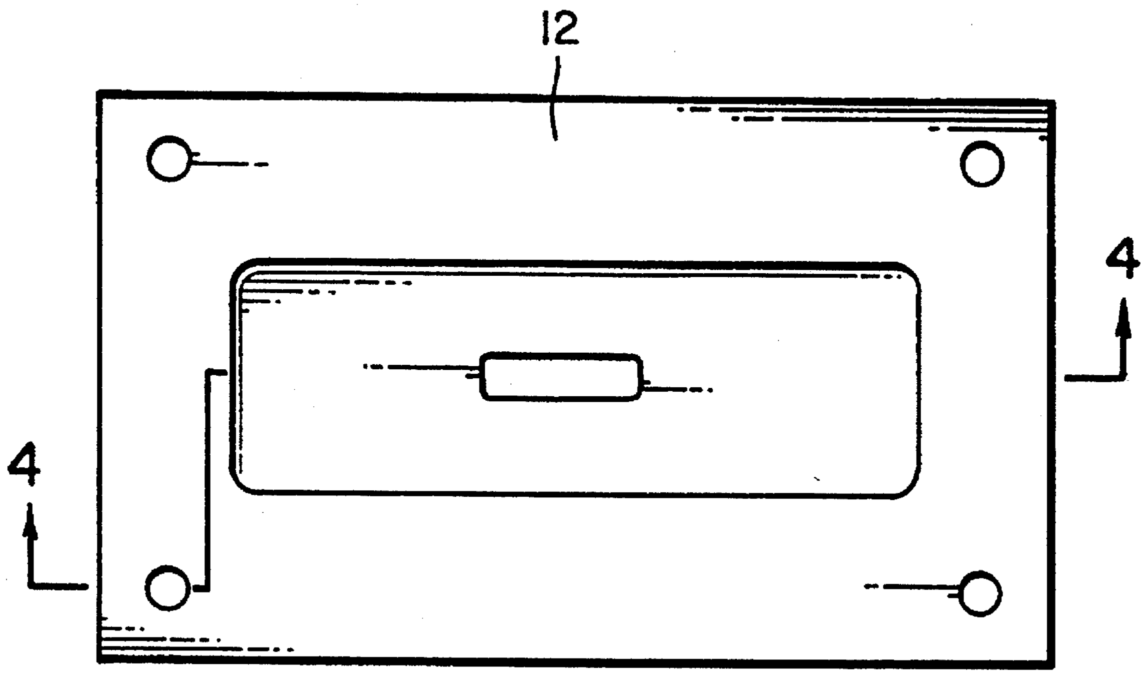
FIG. 5 is a top view of the cutting anvil shown in FIG. 4.
Figure 4:
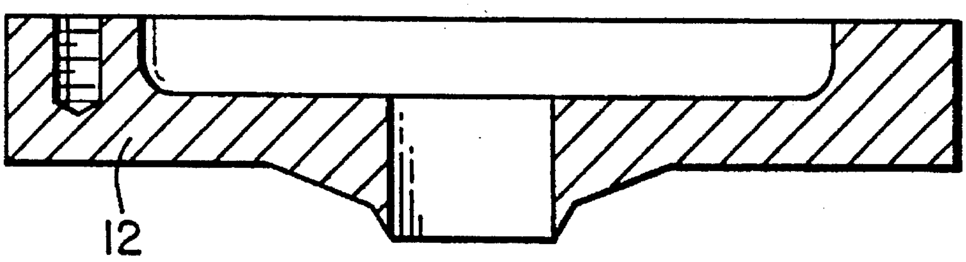
FIG. 4 is a side view of the cutting anvil shown in FIG. 3.

This delay period is also required before the actual cutting process takes place ultrasonically to allow placement of the pick mechanism 34. While the alignment of the ultrasonic horn 18 to the anvil 12 is taking place by the pressure of the actuator 16 the pick mechanism 34 is positioned for accurate placement of the completed velvet chip. Referring again to FIG. 2, the pick mechanism 34 has two tapered pins 36 and is lowered through a rectangular hole in the machine table 32 down through the back side of the hollow portion of the cutting anvil 12 (see FIGS. 4 and 5). This downward motion is interrupted when the pins 36 have barely pierced the backing side of the velvet web 10 in the hollow portion of the cutting anvil 12. At this point the ultrasonic generator 30 is energized allowing the ultrasonic horn 18 and cutting anvil 12 to complete the die process.

It is important to note that the ultrasonic horn working face 38 must come in contact with the cutting anvil 12 to successfully complete the cutting process. This requires an ultrasonic generator 30 capable of withstanding metal to metal contact for a few hundred milliseconds without going into overload condition. The ultrasonic horn 18 and cutting anvil 12 are both made of D-2 tool steel with the rockwell hardness of the cutting anvil 12 slightly harder than the ultrasonic horn 18. This combination gives the best result in longevity of the design shape of the cutting anvil surface with the least impression of the anvil cutting surface worn into the ultrasonic working face.

The ultrasonic cycle is designed with a second delay after the cutting process which maintains the completed chip in position in the hollow portion of the cutting anvil 12, setting on the ultrasonic horn face 38. At this time the pick mechanism 34 continues its descent downward forcing the two tapered pins 36 through the velvet chip and inserting them into two matching clearance holes 40 provided in the ultrasonic horn face 38 until the velvet chip is forced against the stripper pad 42 (see also FIG. 3). This delay procedure, by maintaining the extended ultrasonic horn 18 position so as to hold the velvet chip captured in the anvil 12, insures a firm surface for pushing the pins 36 through the velvet material 10 and thereby maintaining it in the same position. This provides precision repeatability in orientation and location of the chip, thereby insuring proper placement within the required tolerances when placed in the cartridge as described below.

Again referring to FIG. 2 and FIG. 3, at this point in the cycle the stripper pad 42 is still fully retracted against the pick head 44 maintained in position by a small pneumatic cylinder 46. The stripper pad 42 may be raised and lowered along the length of the tapered pins 36 by the pneumatic cylinder 46. When the pick mechanism 34 has completed its descent and the velvet chip is secured, it reverses its direction, raising the pick head 44 out of the hollow portion of the cutting anvil 12 until it clears the machine table 32 top. The pick mechanism 34 then swivels to locate the pick head 44 directly over the cartridge shell where the chip will be placed. The pick head is then lowered into position and the stripper pad, by means of the small pneumatic cylinder, removes the velvet chip from the two tapered pins and sets it in place in the allotted location on the cartridge shell. The cycle has now been completed and the system resets itself for the next cycle.

Figure 6:
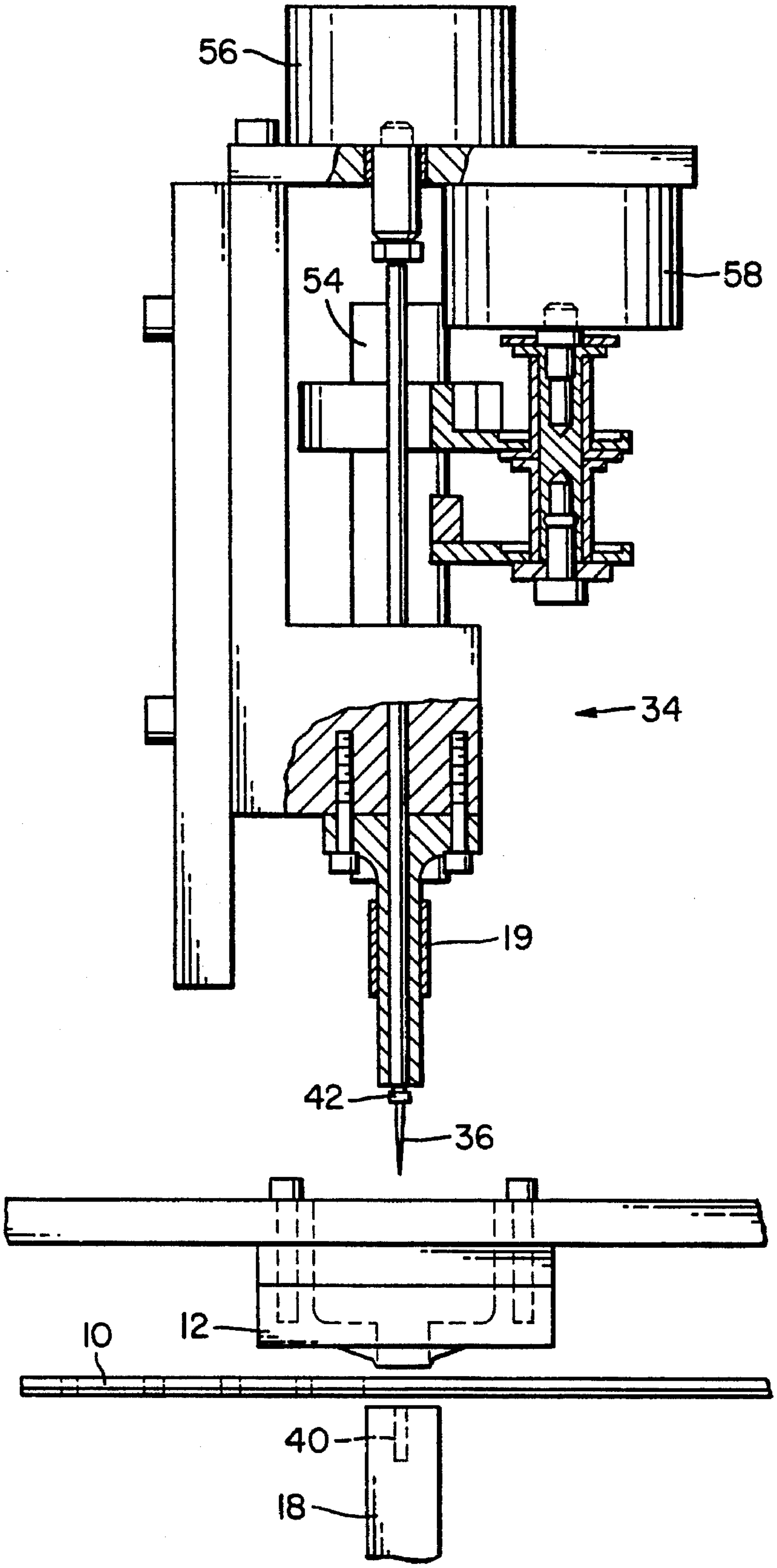
FIG. 6 is a cross-sectional side view of the pick mechanism positioned over the cutting mechanism, according to the apparatus shown in FIG. 2.

FIG. 6 shows a close up of the cutting die station of FIG. 1 where the velvet web material 10 has been located between the die cut anvil 12, and the flat tipped ultrasonic horn 18. The ultrasonic horn 18 has two recessed holes 40 to allow for penetration of the tapered pins 36. The stripper pad 42 is shown and one of the 70 Kilohertz ultrasonic horns 18 is shown connected to one of the 70 Kilohertz ultrasonic transducers 54. The transducer and horn produce the oscillating mechanical energy to tack the velvet chip to the thermoplastic cartridge during the later assembly step. The pneumatic pancake cylinders 56 and 58 raise and lower the stripper pad 42 and the two 70 Kilohertz ultrasonic horns 18 respectively.

Figure 7:
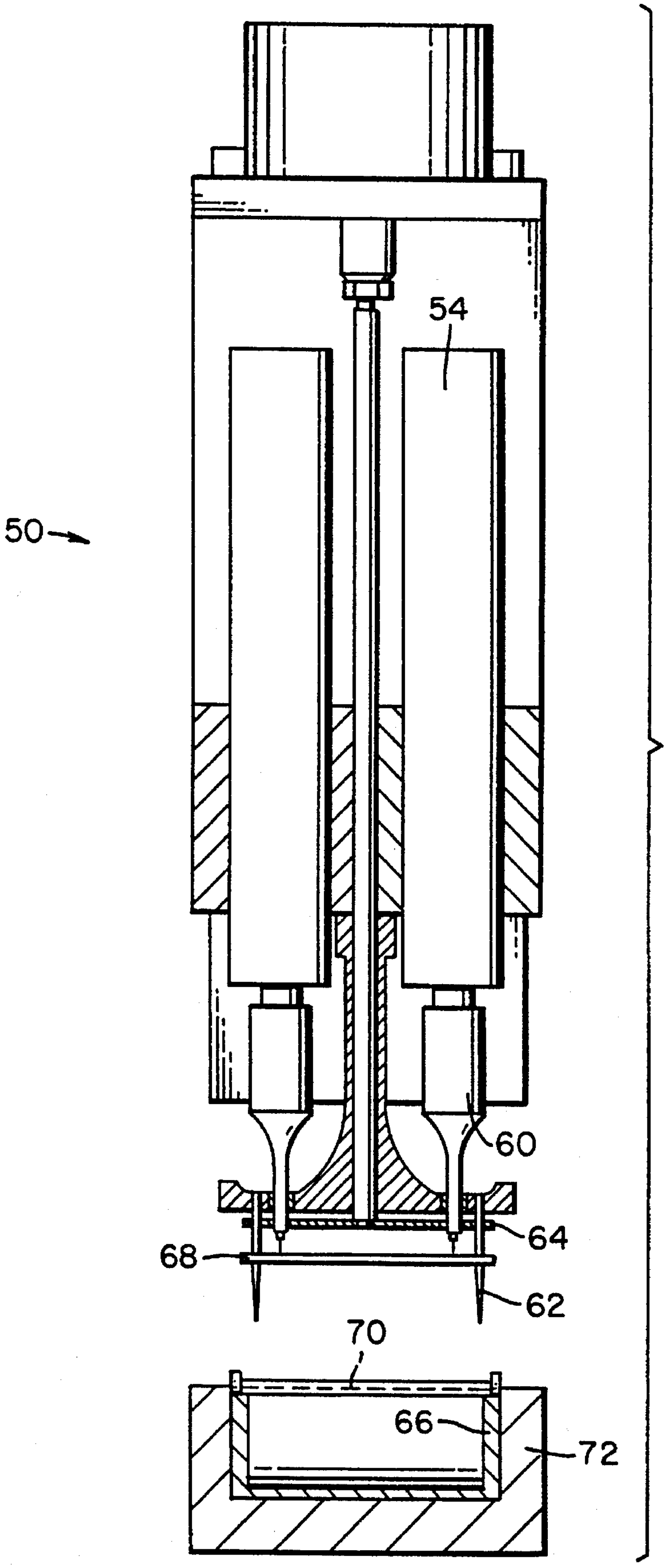
FIG. 7 is a cross-sectional side view of another embodiment of the subject invention which utilizes a pick mechanism having two tapered pins, shown after the pick mechanism is positioned over the cartridge shell half.

FIG. 7 shows another embodiment of a pick and place mechanism 50 located over a cartridge shell half 66 and ready to assemble the velvet chip 68 to the light lock area in the cartridge 70. The pick and place mechanism 50 is lowered by the robotic arm until the tapered pins 62 contact the cartridge light lock area surface 70. Next the stripper pad 64 is lowered forcing the velvet chip 68 down the length of the pins 62 until it reaches the surface 70. Then the ultrasonic horns 60 are lowered and forced pneumatically into the velvet material, and the ultrasonic transducers 54 are activated. This welds the velvet chip 68 to the proper location in the light lock area 70 while the cartridge half 66 is secured in the cartridge shuttle nest 72.

Figure 8:
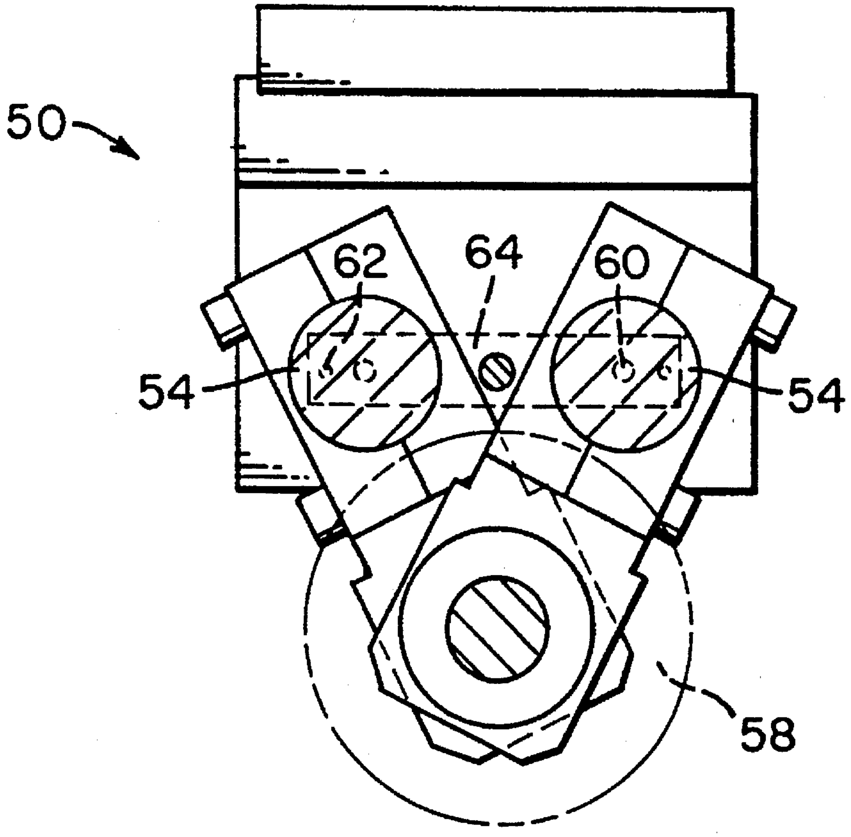
FIG. 8 is a top view of the pick and place mechanism shown in FIG. 7.
Figure 9:
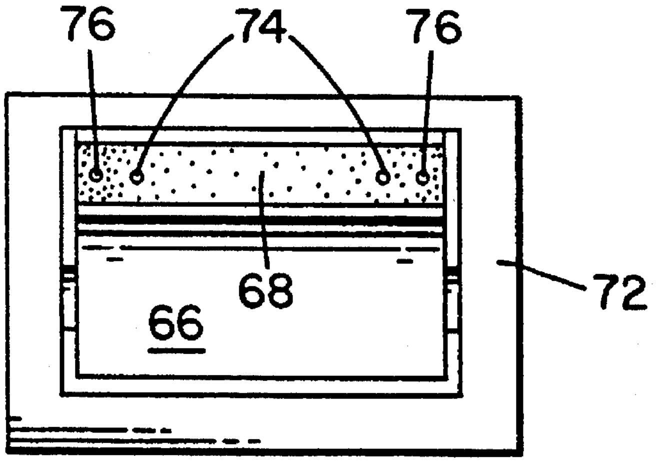
FIG. 9 is a top view of a finished cartridge shell half, after insertion of the velvet chip according to FIG. 7.

FIG. 8 is a top view of pick and place mechanism shown in FIG. 7, and FIG. 9 shows a finished cartridge shell half, with the velvet chip installed. For better clarity the two views are not directly in line as would be the case in the actual apparatus. The pick and place mechanism 50 with the 70 Kilohertz transducers 54 mounted to clamps attached to the shaft of the pancake cylinder 58 and the stripper pad 64 are shown. The left taper pin 62 and the center of the right 70 Kilohertz ultrasonic horn 60 are also shown. FIG. 9 shows a completed cartridge shell half 66 still secured to the cartridge shuttle nest 72 with a velvet chip 68 attached ultrasonically at points 74. Holes 76 indicate where the tapered pins 62 pierced the velvet chip 68. Due to the structure of the velvet chip's nylon fiber bundles, neither (74) nor (76) is easily detected by the naked eye.

Figure 10:
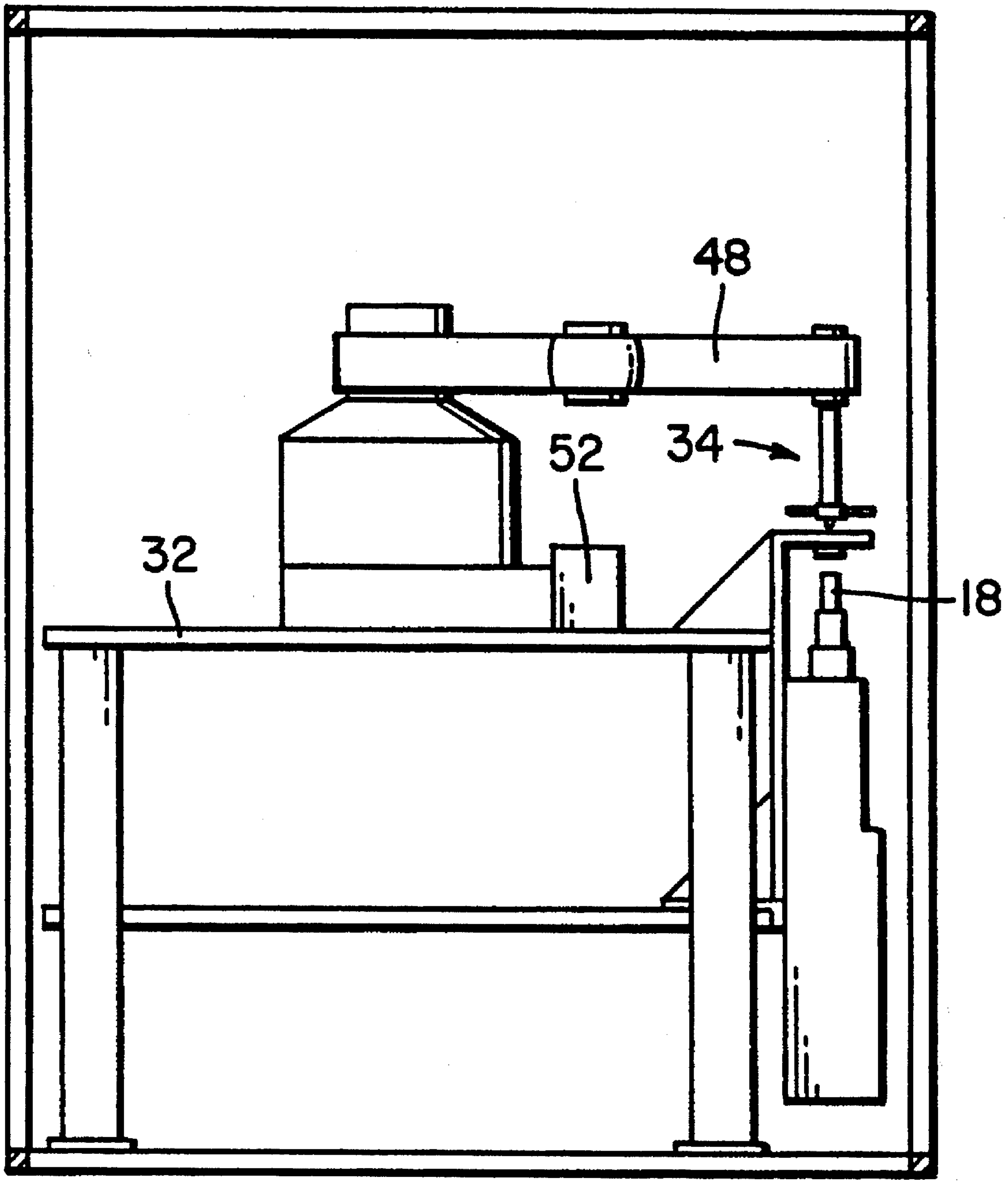
FIG. 10 is a side view of a cutting, picking, placing, and tacking apparatus according to one embodiment of the subject invention.

FIG. 10 is a side view of one embodiment of the overall assembly machine. There is shown the location of the robotic arm 48 attached to the machine table 32 incorporating the mechanical pick and place mechanism 34 and ultrasonic cutting horn 18. The location of the cartridge shell nest 52 is also shown.

Although preferred embodiments have been depicted and described in detail herein, it will be apparent to those skilled in the relevant art that various modifications, additions, substitutions and the like can be made without departing from the spirit of the invention, and these are therefore considered to be within the scope of the invention as defined by the following claims.

What is claimed is:

1. A method of cutting and placing individual chips of light lock material in a cartridge, said method comprising:

positioning light lock material between an ultrasonic horn and a hollow centered anvil;

contacting said ultrasonic horn and said hollow centered anvil with opposing sides of said light lock material;

energizing said ultrasonic horn so as to cut said light lock material and form an individual chip of light lock material;

picking said individual chip of light lock material through said hollow center of said anvil; and placing said individual chip of light lock material in a cartridge.

2. The method of claim 1 wherein said picking comprises:

mounting one or more pins to a pivotable and retractable arm;

extending said arm so as to insert said one or more pins into said individual chip of light lock material; and retracting said arm, wherein said individual chip of light lock material is removed through said hollow center of said anvil by said pins as said arm retracts.

3. The method of claim 2 wherein said placing comprises:

mounting a retractable pad to said pivotable and retractable arm, said pad having apertures therein for passing of said one or more pins; and extending said pad so as to push said individual chip of light lock material off of said one or more pins and into a cartridge as said one or more pins pass through said pad.

4. The method of claim 3 further comprising tacking said individual chip of light lock material to said cartridge.

5. The method of claim 4 wherein said tacking comprises:

mounting one or more retractable ultrasonic horns to said arm, wherein said pad has apertures therein for passage of said one or more ultrasonic horns;

extending said one or more ultrasonic horns to contact said individual chip of light lock material held in said cartridge by said pad; and energizing said one or more ultrasonic horns so as to tack said individual chip of light lock material to said cartridge.

* * * * *